United States Patent Office 2,796,317
Patented June 18, 1957

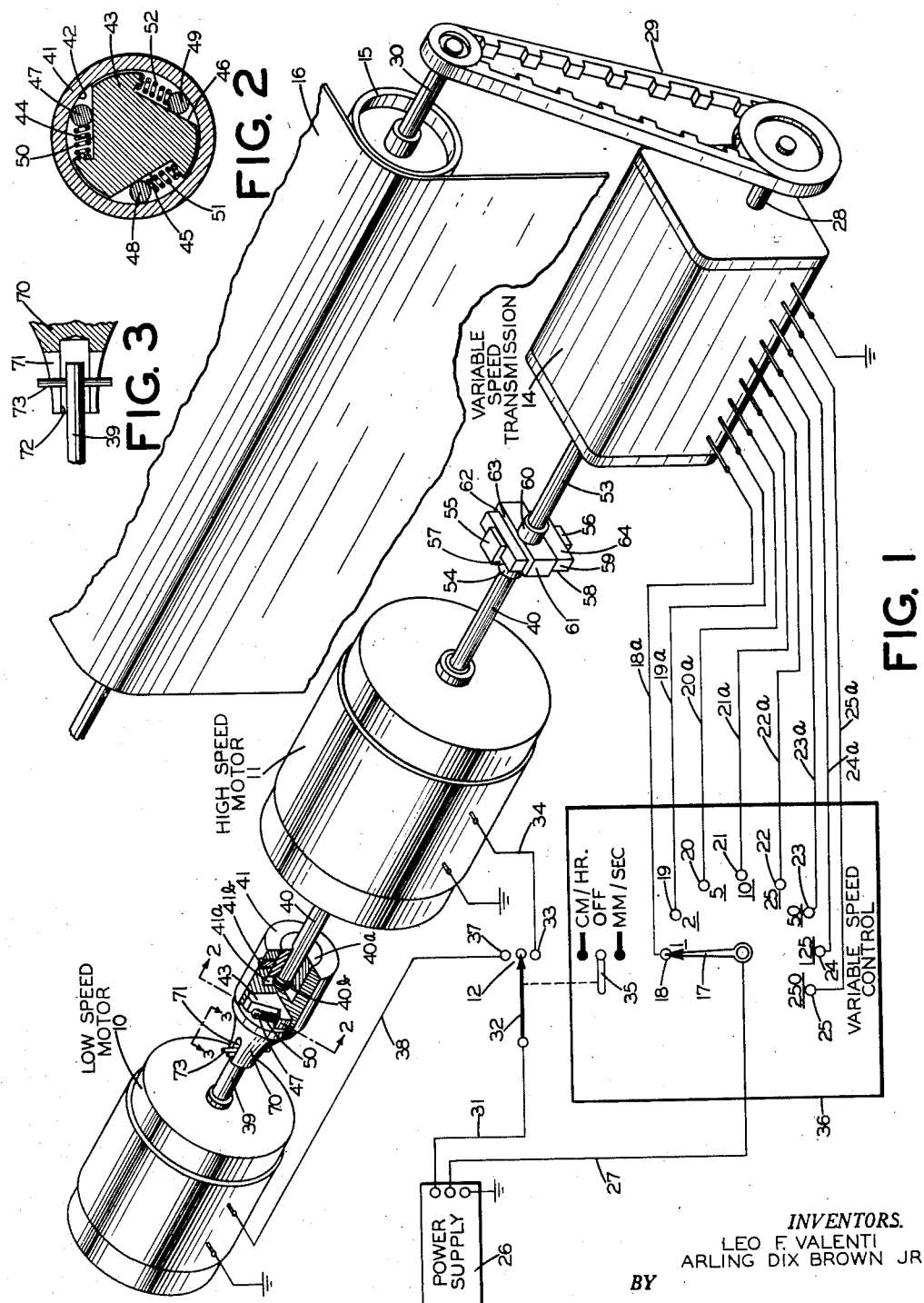

2,796,317

PEN RECORDER RECORD CHART DRIVE

Leo F. Valenti, Garfield Heights, and Arling Dix Brown, Jr., East Cleveland, Ohio, assignors to Clevite Corporation, Cleveland, Ohio, a corporation of Ohio Application March 10, 1954, Serial No. 415,262

6 Claims. (Cl. 346—136)

This invention relates to a drive arrangement for moving linearly the record chart in a pen recorder.

Ordinarily in the use of pen recorders for recording information data in the form of visual traces on a record chart, the record chart is moved past the recording pen linearly at a speed within the range from about 1 mm./sec. to 250 mm./sec. This range of record chart speeds is adequate for most applications. In the copending U. S. patent application of A. Dix Brown and Leo F. Valenti, Serial No. 365,368, filed July 1, 1953, there has been disclosed a variable eight-speed transmission which desirably may be driven from a suitable driving motor to in turn drive the record chart in a pen recorder at predetermined speeds within this range.

For certain uses, however, it is preferable to move the record chart at much slower speeds than the range above mentioned. In particular, certain applications require that the record chart be moved at a speed within the range from 1 cm./hr. to 250 cm./hr. It will be recognized that this lower speed range represents a speed reduction of 360 to 1 from the mm./sec. speed range ordinarily employed in pen recorders. To incorporate such a speed reduction in the variable speed transmission itself would increase unduly the complexity and physical size of the transmission, as well as appreciably adding to its expense.

The present invention is directed toward a motor drive mechanism for the movable record chart in a pen recorder which is capable of moving the record chart at various speeds within the lower range (cm./hr.), as well as at speeds within the higher range (mm./sec.), in a novel and efficacious manner.

Accordingly, it is an object of the present invention to provide a novel and improved motor drive mechanism for moving the record chart in a pen recorder.

It is also an object of this invention to provide a novel drive mechanism for moving the record chart in a pen recorder which has provision for selectively establishing and indicating respective drives to the record chart for moving the latter at various speeds within the high speed range from 1 to 250 mm./sec. or at various speeds within the low speed range from 1 to 250 cm./hr.

Another object of this invention is to provide a novel motor drive arrangement which is particularly adapted for use with the variable speed transmission disclosed in the copending application Serial No. 365,368 to drive the record chart in a pen recorder at speeds within the low speed range from 1 to 250 cm./hr. or at speeds within the high speed range from 1 to 250 mm./sec.

The foregoing objects, as well as such other and further objects and advantages as may become apparent hereinafter, are accomplished in a particularly effective manner by the specific preferred embodiment of this invention illustrated in the accompanying drawing and described in the following detailed description.

In accordance with this preferred embodiment of the present invention, the foregoing purposes are accomplished by the provision of a drive mechanism which includes a high speed motor coupled to the input to the variable speed transmission, a low speed motor having a speed ratio of 1 to 360 to the high speed motor and having its shaft coupled to the high speed motor shaft through an overrunning clutch which enables the high speed motor, when energized, to overrun the low speed motor and which imparts the drive from the low speed motor, when energized, to the transmission input through the shaft of the high speed motor, a drive selector for energizing the motors alternatively, and a speed indicator which by its numerical setting indicates the record chart speed in either mm./sec. or cm./hr., depending upon whether the high or low speed motor is energized.

In the drawing:

Figure 1 is a schematic perspective view, with certain parts broken away for clarity, showing the drive mechanism of the present invention;

Figure 2 is a transverse section, taken along the line 2—2 in Fig. 1, through the overrunning clutch acting between the low and high speed motors in the drive mechanism; and Figure 3 is a longitudinal fragmentary section centrally through the coupling between the low speed motor shaft and the overrunning clutch assembly, taken along the line 3—3 in Fig. 1.

Referring to Fig. 1, in general outline the present invention includes a low speed motor 10, a high speed motor 11, a switch, indicated generally at 12, controlling the energization of the motors so that they are energized alternatively, an overrunning clutch 13 acting between the shafts of the low and high speed motors, a variable speed transmission, indicated generally at 14, having its input shaft coupled to the high speed motor and its output shaft coupled to the roller 15 which drives the record chart 16, and a calibrated speed selector which includes a movable switch contact 17 which controls the variable speed transmission 14 to establish therein predetermined different ratios of input to output speeds to drive the record chart accordingly.

The variable speed transmission 14 preferably is constructed and arranged as disclosed in the copending application Serial No. 365,368. In this transmission there may be established selectively output to input speed ratios of 1:250, 1:125, 1:50, 1:25, 1:10, 1:5, 1:2, and 1:1. The particular speed ratio in effect in the variable speed transmission is determined electrically in the present assembly by the position of the adjustable pivoted switch contact 17. Adjustable contact 17 may be moved selectively to engage any one of a series of terminals 18–25 arranged in evenly spaced relationship about the pivot axis of contact 17. Each of these terminals is connected through a corresponding line (18a–25a, respectively) to the variable speed transmission 14 to control the latter's operation. The electrical power supply for controlling the variable speed transmission 14 is from the source 26 through line 27 to the adjustable contact 17, and thence through the particular terminal which is then engaged by contact 17 to the transmission. The variable speed transmission 14 has its output shaft 28 coupled through a "Gilmer timing belt" drive 29 to the shaft 30 on which is mounted the drive roller 15 for moving the record chart 16 linearly past the recording pen (not shown). The fixed terminals 18–25 are calibrated with numbers "1," "2," "5," "10," "25," "50," "125," and "250," which have the proportions to each other of the respective output to input speed ratios established in the transmission 14 with the corresponding respective settings of the adjustable contact 17. Thus, for an output to input speed ratio of 1:250 in the transmission, the contact 17 engages terminal 18 at the numerical setting designated "1"; for an output to input speed ratio of 1:125 in the transmission, the contact 17 engages the terminal 19 at the numerical setting designated "2," and so on. Also, the construction and arrangement is such that, with the high speed motor imparting the input drive to transmission 14 the transmission drives the record chart 16 linearly at a speed in mm./sec. represented by the numerical setting of the adjustable contact 17, while with the input drive to the transmission imparted by the low speed motor 10 the record chart moves linearly at a speed in cm./hr. corresponding to the numerical setting of adjustable contact 17. A knob (not shown) may be provided to facilitate setting the adjustable contact 17 to the desired position to establish a particular output to input speed ratio in the transmission.

The high speed motor 11 in one practical embodiment may have an operating speed of 1800 R. P. M. The field coil of this motor receives its energization from the power supply 26 by way of line 31, the adjustable contact 32 of switch 12, the fixed contact 33 and line 34. The movable switch contact 32 is suitably mechanically connected to a pivoted actuator 35, which is mounted at the front of the mounting plate 36 at which the adjustable switch contact 17 is mounted. The arrangement is such that when the actuator 35 is moved clockwise in Fig. 1 away from its "off" position so that it points toward the legend "mm./sec." on the mounting plate then the adjustable switch contact 32 is thereby moved into engagement with the fixed contact 33, thereby completing the energization circuit for the high speed motor 11.

The low speed motor has a speed 1/360 that of the high speed motor, or in this instance 5 R. P. M. The field coil of this motor receives its energization from the power source 26 by way of line 31, movable switch contact 32, the fixed contact 37 associated therewith and line 38. When switch actuator 35 is moved to its extreme position counterclockwise, so that it points to the legend "cm./hr." on the mounting plate, it thereby positions the adjustable switch contact 32 in engagement with the fixed contact 37 to thereby complete the energization circuit for the low speed motor 10.

The low speed motor 10 has its rotor shaft 39 coupled to the rotor shaft 40 of the high speed motor 11 through a conventional overrunning clutch arrangement, indicated generally at 13 in Fig. 1. This clutch includes a sleeve member 41 which is secured rigidly to one end of the high speed motor shaft 40 by means of a cylindrical collar 40a, extending snugly around one end of the shaft 40 and received snugly in a complementary cylindrical recess 41a in the sleeve 41, and a set screw 41b extending through the sleeve 41 and engaging the collar 40a to clamp the parts together tightly. A lock ring 40b is provided on the shaft 40 to prevent its withdrawal axially through the collar 40a. At its end remote from the high speed motor the sleeve member 41 defines a cylindrical recess 42 for the reception of a plate 43, which is integral with a coupling member 70 by which the low speed motor shaft is adapted to be coupled to the overrunning clutch assembly. The plate 43 has a generally cylindrical periphery having a close running fit in recess 42. The plate 43 is cut away at three evenly spaced locations 44-46, respectively, on its periphery and receives thereat balls 47-49, respectively, which are spring-pressed by compression coil springs 50-52, respectively, to engage the cylindrical side wall 42 on the sleeve member 41.

In operation, with the low speed motor shaft coupled to the coupling member 70 in the manner described in detail hereinafter, when the high speed motor 11 is energized its shaft 40 turns counterclockwise in Figs. 1 and 2 to turn the sleeve member 41 freely about the plate 43, so that the high speed motor shaft 40 freely overruns the low speed motor shaft 39 as it (the high speed motor shaft) imparts the high speed input drive to the transmission 14.

However, when the low speed motor 10 is energized and the high speed motor 11 is de-energized, the low speed motor shaft 39 turns counterclockwise in Fig. 1 to impart counterclockwise rotation to the coupling 70 and the integral plate 43, which at this time is coupled frictionally through the spring-pressed balls 47-49 to the sleeve member 41 connected to the shaft 40 of the high speed motor. In this manner the low speed motor, when energized, drives the shaft 40 and the rotor of high speed motor 11 in a counterclockwise direction to impart the low speed input drive to the transmission 14.

The low speed motor shaft 39 has a separable coupling to the coupling member 70 which permits the coupling together of the high and low speed motor shafts even though they may be somewhat misaligned. The coupling member 70 at its outer end (remote from the integral plate 43) is formed with an elongated transverse diametrical slot 71, which is open at the outer end of this coupling member. Intersecting this slot 71 is an axially extending cylindrical bore 72 (Fig. 3), which is open at the outer end of the coupling member 70 and which is substantially larger in cross section than the cross section of the low speed motor shaft 39. This shaft extends freely into the bore 72 and carries a cross pin 73, which is loosely received in the slot 71 and which serves to impart rotation from the shaft 39 to the coupling member 70. It will be recognized that this arrangement provides a releasable coupling between the low speed motor and the coupling member 70. The loose fit of the cross pin 73 in the slot 71 permits a certain amount of eccentricity between the low and high speed motor shafts, while the axial length of slot 71 and bore 72 in the coupling member 70 permit lengthwise adjustment of the low speed motor axially toward or away from the overrunning clutch assembly.

The opposite end of the shaft 40 of the high speed motor is coupled to the input shaft 53 for the variable speed transmission 14 by a novel arrangement which includes a bifurcated coupling member 54 attached rigidly to the motor shaft 40 and provided with spaced, parallel projecting arms 55 and 56, respectively, interconnected by a bridging segment 57 which at its flat outer face (away from motor 11) abuts against the flat major face 58 of a rectangular piece 59 of nylon. The arms 55 and 56 extend across opposite parallel side edges of the nylon piece 59 contiguous to those side edges. The transmission input shaft 53 carries a similar bifurcated coupling member 60 formed with a pair of spaced, parallel projecting arms 61 and 62, which extend across the opposite side edges of the nylon piece 59 contiguous to these side edges and perpendicular to the side edges engaged by the arms 55, 56 on the other bifurcated coupling member. These arms 61 and 62 are interconnected by a bridging segment 63 which has its flat outer face (away from the transmission 14) abutting against the other flat major face 64 of the nylon piece.

With the novel coupling arrangement, any eccentricity between the shafts 40 and 53 in a direction parallel to the arms 61, 62 on the bifurcated coupling member 60 is accommodated by virtue of the fact that the coupling member 60 on shaft 53 is free to slide in that direction across the flat face 64 on the nylon piece 59. Similarly, any eccentricity between shafts 40 and 53 in a direction parallel to the arms 55, 56 on the bifurcated coupling member 54 is accommodated by the freedom of the coupling member 54 to slide in that direction across the opposite flat face 58 on the nylon piece 59. Therefore, while this coupling arrangement serves to impart rotation to the transmission input shaft 53 from the motor shaft 40, it avoids binding or excessive bearing loads on the shafts should they be off-center with respect to one another.

While nylon or teflon are particularly advantageous materials for the coupling piece 59 from the standpoint of quietness, it is to be understood that other materials, such as steel or any other metal, could be employed as the material of the coupling member without essentially changing the mode of operation of the coupling.

*Operation*

In the operation of the drive mechanism described above, either high or low speed operation may be selected by moving the switch actuator 35 to point toward either the "mm./sec." legend or the "cm./sec." legend on the mounting plate. Such positioning of the switch actuator positions the movable switch contact 32 to engage the corresponding terminal 33 or 37 to energize either the high speed motor 11 or the low speed motor 10.

If the high speed motor 11 is energized, then its shaft 40 turns counterclockwise in the drawing and freely overruns the shaft 39 of the low speed motor 10, which is deenergized at this time. The high speed motor shaft 40 drives the input shaft 53 for the variable speed transmission at a speed of 1800 R. P. M. The adjustable speed control switch contact 17 is positioned to engage a particular one of the terminals 18–25, with its numerical setting thereat representing the desired linear speed of the record chart in mm./sec. This sets up the drive conditions in the variable speed transmission which establish the proper output to input speed ratio in the transmission to achieve this record chart speed.

If the low speed motor 11 is energized, its shaft 39 drives the high speed motor shaft 40 through the clutch 13 and this shaft in turn drives the transmission input shaft 53. The numerical setting of the speed control contact 17 determines the linear speed in cm./hr. of the record chart.

From the foregoing it will be evident that the specific arrangement described in detail above, with reference to the accompanying drawing, is particularly effective to accomplish the objects and purposes of the present invention in an efficacious manner. However, while there is disclosed herein a specific preferred embodiment of this invention, it is to be understood that various modifications, omissions and refinements which depart from the disclosed embodiment may be adopted without departing from the spirit and scope of this invention.

We claim:

1. In a drive mechanism for advancing the movable record chart in a pen recorder, the combination of a variable speed transmission having its output coupled to the record chart to drive the latter and constructed and arranged to selectively establish different preselected ratios between its output and input speeds, an adjustable chart speed indicator calibrated in a series of numbers which have the proportions to one another of said preselected output to input speed ratios in the variable speed transmission, said chart speed indicator being connected to said variable speed transmission to control the drive conditions therein so that the output to input speed ratio in the transmission corresponds to the numerical setting of the adjustable chart speed indicator, a low speed motor, a high speed motor, means for driving the transmission input selectively from either motor to establish selectively at the transmission input either a low speed input drive from the low speed motor causing the output from the transmission to drive the record chart linearly at a speed in cm./hr. designated by the numerical setting of the speed indicator or a high speed input drive from the high speed motor which is 360 times said low speed input drive and which causes the output from the transmission to drive the record chart linearly at a speed in mm./sec. designated by the numerical setting of the adjustable speed indicator, a switch connected to select which of the motors drives the transmission, and an actuator for the switch movable to selectively establish and indicate the low speed input drive to the transmission which produces linear movement of the record chart at a speed in cm./hr. designated by the numerical setting of the speed indicator or the high speed input drive to the transmission which produces linear movement of the record chart at a speed in mm./sec. designated by the numerical setting of the speed indicator.

2. The drive mechanism of claim 1, wherein the high speed motor has its shaft at one end coupled to the input to the variable speed transmission, and wherein there is provided an overrunning clutch acting between the other end of the shaft of the high speed motor and the shaft of the low speed motor which permits the high speed motor shaft to overrun the low speed motor shaft when the high speed motor is energized and which couples the low speed motor shaft to the high speed motor shaft when the low speed motor is energized and the high speed motor is deenergized to drive the transmission input from the low speed motor through the shaft of the high speed motor.

3. In a drive mechanism for moving the record chart in a pen recorder, the combination of a low speed motor, a high speed motor, a variable speed transmission having its output coupled to the record chart to move the latter, means for selectively coupling the input to the transmission to the low speed motor when the latter is energized to establish a low speed input drive to the transmission and to the high speed motor when the latter is energized to establish a high speed input drive to the transmission which is 360 times the speed of said low speed input drive, an adjustable chart speed indicator calibrated in a series of numbers whose proportions to one another represent the ratios of the output to input speeds in the transmission in the respective different speed conditions which may be established in said transmission, said numbers on the chart speed indicator also representing the linear record chart speeds in mm./sec. or cm./hr. depending upon whether the high or the low speed input drive to the transmission is established, said adjustable speed indicator controlling the variable speed transmission to establish an output to input speed ratio in the transmission corresponding to the numerical setting of the speed indicator, a switch controlling the energization of the motors to selectively energize the motors alternatively, and a movable actuator for said switch having a first position in which it actuates the switch to energize the low speed motor to establish the low speed input to the transmission so that the output from the transmission drives the chart at a linear speed in cm./hr. corresponding to the numerical setting of the speed indicator and having a second position in which it actuates the switch to energize the high speed motor to establish a high speed input to the transmission so that the output from the transmission drives the chart at a linear speed in mm./sec. corresponding to the numerical setting of the speed indicator.

4. In a drive mechanism for moving the record chart in a pen recorder, the combination of a variable speed transmission having its output coupled to the record chart to drive the latter, a high speed motor having its shaft at one end coupled to the input to the variable speed transmission, a low speed motor, an overrunning clutch acting between the opposite end of the high speed motor shaft and the shaft of the low speed motor, means for selectively energizing either the high speed motor or the low speed motor alternatively, said overrunning clutch when the high speed motor is energized to drive the record chart at high speed permitting the high speed motor shaft to overrun the low speed motor shaft, and said overrunning clutch when the low speed motor is energized coupling the low speed motor shaft to the high speed motor shaft to drive the transmission input at low speed from the low speed motor through the shaft of the high speed motor.

5. In a drive mechanism for imparting movement to the record chart in a pen recorder, the combination of a low speed motor, a high speed motor having a speed 360 times that of the low speed motor, an overrunning clutch acting between one end of the high speed motor shaft and the low speed motor shaft, said overrunning clutch being constructed and arranged to permit the high speed motor shaft to overrun the low speed motor shaft when the high speed motor is energized and to couple together the motor shafts to drive the high speed motor shaft from the low speed motor when the low speed motor is energized and the high speed motor is deenergized, a variable speed transmission having an input shaft coupled to the other end of the high speed motor shaft to be driven thereby and having its output shaft coupled to the record chart to drive the record chart at a speed determined by the speed of the transmission input shaft and the output to input speed ratio in the transmission, said transmission having provision for establishing selectively any of a number of preselected output to input speed ratios in the transmission, an adjustable chart speed indicator calibrated in a series of numbers which have the proportions to one another of said preselected output to input speed ratios in the transmission, and connections from said chart speed indicator to the variable speed transmission to establish in the transmission corresponding output to input speed ratios such that the record chart is driven at a speed in mm./sec. designated by the numerical setting of said chart speed indicator when the high speed motor is energized to drive the transmission input and at a speed in cm./hr. designated by the numerical setting of said chart speed indicator when the input drive to the transmission is from the low speed motor.

6. In a drive mechanism for advancing the record chart in a visual recorder, the combination of a variable speed transmission having its output coupled to the record chart to drive the latter, a high speed motor having its shaft at one end coupled to the input to the variable speed transmission, a low speed motor, an overrunning clutch acting between the other end of the high speed motor shaft and the shaft of the low speed motor, means for selectively energizing the motors, said overrunning clutch when the high speed motor is energized to drive the record chart at high speed permitting the high speed motor shaft to overrun the low speed motor shaft, and said overrunning clutch when the low speed motor is energized and the high speed motor is de-energized coupling the low speed motor shaft to the high speed motor shaft to drive the transmission input at low speed from the low speed motor through the shaft of the high speed motor.

References Cited in the file of this patent

UNITED STATES PATENTS

| | | |
|---|---|---|
| Re. 15,125 | Lindquist et al. | June 14, 1921 |
| 1,550,779 | Carpenter | Aug. 25, 1925 |
| 2,007,513 | Westburgh | July 9, 1935 |
| 2,059,879 | La Pierre | Nov. 3, 1936 |
| 2,259,139 | Oesinghaus | Oct. 14, 1941 |
| 2,531,644 | Rayburn | Nov. 28, 1950 |
| 2,581,804 | Marx | Jan. 8, 1952 |
| 2,657,587 | Volk et al. | Nov. 3, 1953 |
| 2,660,899 | McCammon | Dec. 1, 1953 |